United States Patent
Mark et al.

(10) Patent No.: US 12,291,347 B2
(45) Date of Patent: *May 6, 2025

(54) CONTAINMENT ZONE FOR AN ELECTRIC MACHINE IN A HYBRID POWERPLANT FOR AN AIRCRAFT

(71) Applicant: Pratt & Whitney Canada Corp., Longueuil (CA)

(72) Inventors: Michael Mark, Montreal (CA); Ion Dinu, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,371

(22) Filed: Jul. 31, 2023

(65) Prior Publication Data

US 2025/0042567 A1    Feb. 6, 2025

(51) Int. Cl.
| | |
|---|---|
| *B64D 35/08* | (2006.01) |
| *B64D 27/24* | (2006.01) |
| *B64D 27/33* | (2024.01) |
| *B64D 27/02* | (2006.01) |

(52) U.S. Cl.
CPC .......... *B64D 35/08* (2013.01); *B64D 27/24* (2013.01); *B64D 27/33* (2024.01); *B64D 27/026* (2024.01)

(58) Field of Classification Search
CPC ...... B64D 35/08; B64D 27/24; B64D 27/026; B64D 27/33
See application file for complete search history.

(56) References Cited

U.S. PATENT DOCUMENTS

| | | | |
|---|---|---|---|
| 10,752,369 | B2 | 8/2020 | Takami |
| 11,603,800 | B2 | 3/2023 | Lacko |
| 11,691,742 | B1 | 7/2023 | Mark |
| 2020/0130534 | A1 | 4/2020 | Julien |
| 2020/0271061 | A1 | 8/2020 | Kopeschka |
| 2020/0277062 | A1 | 9/2020 | Becker |
| 2020/0347743 | A1 | 11/2020 | Long |
| 2021/0031934 | A1 | 2/2021 | Becker |
| 2021/0061453 | A1* | 3/2021 | Olson ............... F16D 41/04 |
| 2021/0163142 | A1 | 6/2021 | Lacko |
| 2021/0300576 | A1* | 9/2021 | Thomassin ............ B64D 35/08 |

FOREIGN PATENT DOCUMENTS

WO    2023012240 A1    2/2023

OTHER PUBLICATIONS

EP Search Report for EP Patent Application No. 24192193.1 dated Nov. 21, 2024.

* cited by examiner

*Primary Examiner* — Rodney A Bonnette
(74) *Attorney, Agent, or Firm* — Getz Balich LLC (57) ABSTRACT

A hybrid powerplant is provided for an aircraft. This hybrid powerplant includes a housing, an electric machine, a machine fluid circuit, a heat engine and a geartrain. The housing includes a machine containment zone and an engine compartment outside of the machine containment zone. The electric machine is arranged within the machine containment zone. The machine fluid circuit services the electric machine. The machine fluid circuit extends in the machine containment zone and is arranged outside of the engine compartment. The heat engine is arranged within the engine compartment. The geartrain is operatively connected to the electric machine and the heat engine.

16 Claims, 11 Drawing Sheets

CONTAINMENT ZONE FOR AN ELECTRIC MACHINE IN A HYBRID POWERPLANT FOR AN AIRCRAFT

TECHNICAL FIELD

This disclosure relates generally to an aircraft and, more particularly, to a hybrid powerplant for the aircraft.

BACKGROUND INFORMATION

A hybrid powerplant for an aircraft may include an electric machine and a thermal engine such as a gas turbine engine or a piston engine. While various hybrid powerplants are known in the art, there is still room in the art for improvement.

SUMMARY

According to an aspect of the present disclosure, a hybrid powerplant is provided for an aircraft. This hybrid powerplant includes a housing, an electric machine, a machine fluid circuit, a heat engine and a geartrain. The housing includes a machine containment zone and an engine compartment outside of the machine containment zone. The electric machine is arranged within the machine containment zone. The machine fluid circuit services the electric machine. The machine fluid circuit extends in the machine containment zone and is arranged outside of the engine compartment. The heat engine is arranged within the engine compartment. The geartrain is operatively connected to the electric machine and the heat engine.

According to another aspect of the present disclosure, another hybrid powerplant is provided for an aircraft. This hybrid powerplant includes a housing, an electric machine, a machine fluid circuit, a heat engine and an engine fluid circuit. The housing includes a machine containment zone, an engine containment zone and a firewall forming a fluid barrier between the machine containment zone and the engine containment zone. The electric machine is arranged within the machine containment zone to a first side of the firewall. The machine fluid circuit services the electric machine and is outside of the engine containment zone. The heat engine is arranged within the engine containment zone to a second side of the firewall. The engine fluid circuit services the heat engine and is outside of the machine containment zone. The engine fluid circuit is fluidly independent of the machine fluid circuit.

According to still another aspect of the present disclosure, another hybrid powerplant is provided for an aircraft. This hybrid powerplant includes a housing, an electric machine, a machine fluid circuit, a heat engine and a geartrain. The housing includes a machine containment zone and an engine compartment outside of the machine containment zone. The electric machine is arranged within the machine containment zone. The machine fluid circuit services the electric machine. The machine fluid circuit does not extend outside of the machine containment zone within the housing. The heat engine is arranged within the engine compartment. The geartrain is operatively connected to the electric machine and the heat engine.

The hybrid powerplant may also include a geartrain operatively connected to the electric machine and the heat engine.

The hybrid powerplant may also include an air mover. The electric machine and/or the heat engine may be operatively coupled to and configured to power operation of the air mover.

The housing may also include a firewall at least partially forming the machine containment zone. The firewall may form a fluid barrier between the machine containment zone and the engine compartment.

The housing may also include a firewall at least partially forming the machine containment zone. The firewall may be configured to maintain the containment zone when subjected to an electrical arc of at least two-hundred and twenty volts.

The housing may also include a firewall at least partially forming the machine containment zone. The firewall may be configured to maintain the containment zone when subjected to a fire.

The housing may also include a firewall at least partially forming the machine containment zone. A mechanical coupler may project through the firewall and operatively couple the electric machine to the geartrain.

The hybrid powerplant may also include a fluid source arranged outside of the housing. The machine fluid circuit may fluidly couple the fluid source with the electric machine. The machine fluid circuit may extend into the machine containment zone from an area outside of the housing.

The housing may also include a firewall at least partially forming the machine containment zone. The machine fluid circuit may extend across the firewall.

The hybrid powerplant may also include a fluid source arranged within the machine containment zone. The machine fluid circuit may fluidly couple the fluid source with the electric machine.

The machine fluid circuit may be configured to provide lubricant to one or more components of the electric machine.

The machine fluid circuit may be configured to cool one or more components of the electric machine.

The hybrid powerplant may also include an engine fluid circuit servicing the heat engine. The engine fluid circuit may extend in the engine compartment and may be arranged outside of the machine containment zone. The engine fluid circuit and the machine fluid circuit may be fluidly independent of one another.

The hybrid powerplant may also include a fluid source arranged outside of the housing. The engine fluid circuit may fluidly couple the fluid source with the heat engine. The engine fluid circuit may extend into the engine compartment from an area outside of the housing.

The hybrid powerplant may also include a fluid source arranged within the housing and outside of the machine containment zone. The engine fluid circuit may fluidly couple the fluid source with the heat engine.

The hybrid powerplant may also include a geartrain fluid circuit servicing the geartrain. The geartrain fluid circuit may extend in the housing and may be arranged outside of the machine containment zone. The geartrain fluid circuit and the machine fluid circuit may be fluidly independent of one another.

The housing may also include an engine containment zone fluidly decoupled from the machine containment zone. The heat engine may be arranged within the engine containment zone.

The geartrain may also be arranged in the engine containment zone.

The geartrain may be arranged outside of the machine containment zone and the engine containment zone.

The housing may also include a geartrain containment zone fluidly decoupled from the machine containment zone and the engine containment zone. The geartrain may be arranged within the geartrain containment zone.

The hybrid powerplant may also include a bladed rotor. The electric machine and/or the heat engine may be operatively coupled to and may be configured to drive rotation of the bladed rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
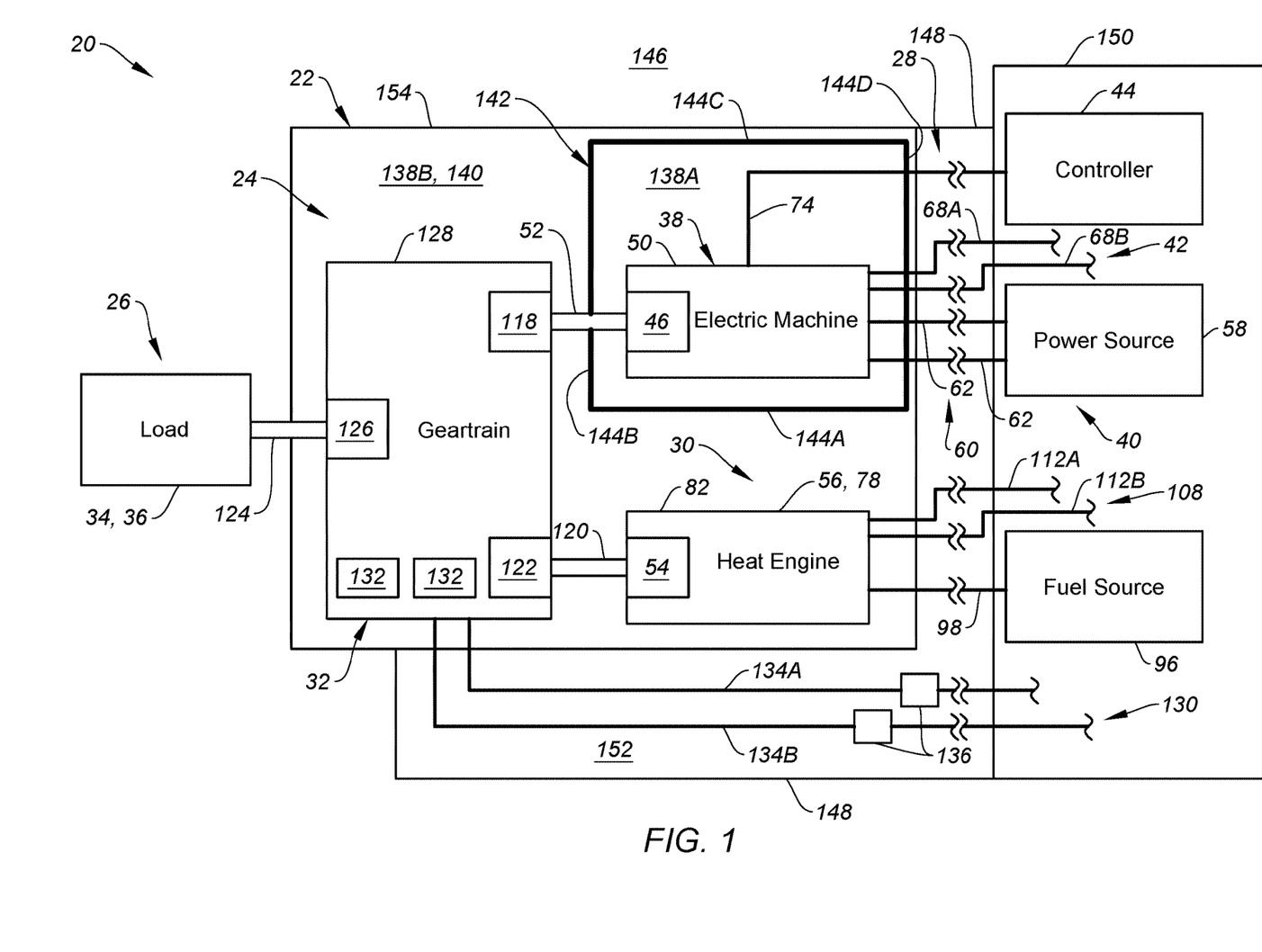
FIG. 1 is a schematic illustration of a parallel hybrid powerplant for an aircraft.

FIG. 1 is a schematic illustration of a hybrid powerplant 20 for an aircraft. The aircraft may be a fixed wing aircraft (e.g., an airplane), a rotorcraft (e.g., a helicopter), a drone (e.g., an unmanned aerial vehicle (UAV)) or any other manned or unmanned aerial vehicle or system. The hybrid powerplant 20 includes a powerplant housing 22 and a powerplant powertrain 24 at least partially (or completely) contained within the powerplant housing 22. The powerplant powertrain 24 includes a mechanical load 26, an electric machine system 28, a heat engine system 30 and a geartrain 32; e.g., an epicyclic gear system, a transmission, a gearbox, etc.

The mechanical load 26 may be configured as or otherwise include a rotor 34 mechanically driven and/or otherwise powered by the electric machine system 28 and/or the heat engine system 30. This driven rotor 34 may be a bladed propulsor rotor 36 (e.g., an air mover) where the hybrid powerplant 20 is (or is part of) a propulsion system for the aircraft. The propulsor rotor 36 includes a plurality of rotor blades arranged circumferentially around and connected to at least (or only) one rotor disk or hub. The propulsor rotor 36 may be an open (e.g., un-ducted) propulsor rotor or a ducted propulsor rotor. Examples of the open propulsor rotor include a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. An example of the ducted propulsor rotor is a fan rotor for a turbofan propulsion system. The present disclosure, of course, is not limited to the foregoing exemplary propulsor rotor arrangements. Moreover, the driven rotor 34 may alternatively be a generator rotor of an electric power generator where the hybrid powerplant 20 is (or is part of) an electric power system for the aircraft; e.g., an auxiliary power unit (APU) for the aircraft. However, for ease of description, the driven rotor 34 may be generally described below as the propulsor rotor 36; e.g., the propeller rotor for the turboprop propulsion system.

Figure 2:
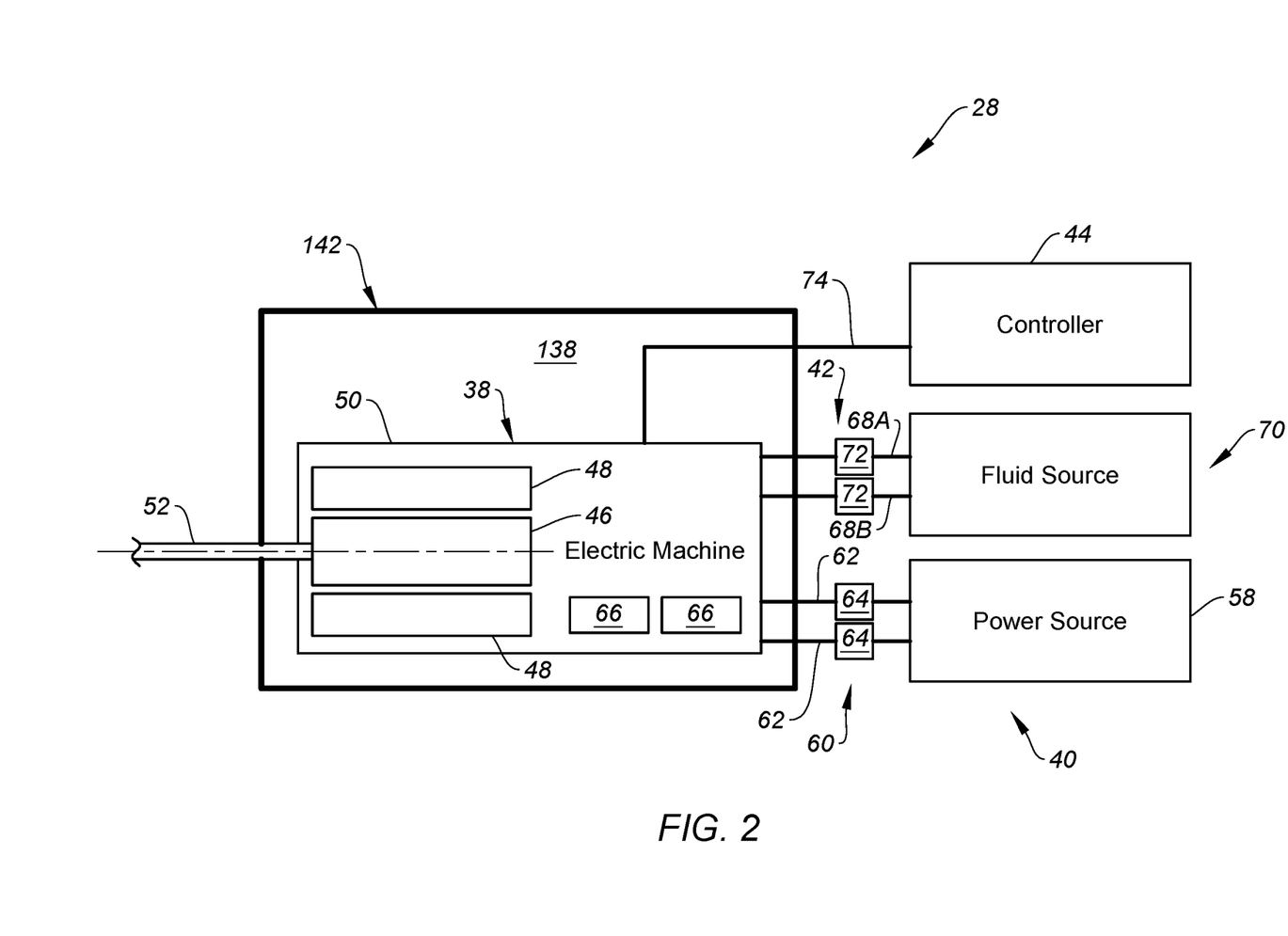
FIG. 2 is a schematic illustration of an electric machine system for the hybrid powerplant.

Referring to FIG. 2, the machine system 28 includes an electric machine 38, an electrical power system 40, an electric machine fluid circuit 42 and a controller 44. The electric machine 38 may be configurable as an electric motor and/or an electric generator; e.g., a motor-generator. The electric machine 38 of FIG. 2, for example, includes an electric machine rotor 46, an electric machine stator 48 and an electric machine housing 50.

The machine rotor 46 is rotatable about a rotational axis of the machine rotor 46, which rotational axis may also be an axial centerline of the electric machine 38. The machine stator 48 of FIG. 2 is radially outboard of and circumscribes the machine rotor 46. With this arrangement, the electric machine 38 is configured as a radial flux electric machine. The electric machine 38 of the present disclosure, however, is not limited to such an exemplary rotor-stator configuration nor to radial flux arrangements. The machine rotor 46, for example, may alternatively be radially outboard of and circumscribe the machine stator 48. In another example, the machine rotor 46 may be axially next to the machine stator 48 configuring the electric machine 38 as an axial flux electric machine. Referring again to FIG. 2, the machine rotor 46 and the machine stator 48 are at least partially or completely housed within the machine housing 50.

During a motor mode of operation, the electric machine 38 operates as the electric motor to convert electricity received from the power system 40 into mechanical power. The machine stator 48, for example, may generate an electromagnetic field with the machine rotor 46 using the electricity. The electromagnetic field may drive rotation of the machine rotor 46. The machine rotor 46 may drive rotation of an electric machine coupler 52 (e.g., a shaft) connected to the machine rotor 46. During this motor mode of operation, the machine coupler 52 of FIG. 2 is configured as a power output for the electric machine 38. The mechanical power generated by the electric machine 38 and output through the machine coupler 52 may be utilized for various purposes within the hybrid powerplant 20. The mechanical power, for example, may boost power for or completely power rotation of the propulsor rotor 36 (the driven rotor 34) of FIG. 1. In another example, the mechanical power may power rotation of an engine rotating assembly 54 within a heat engine 56 of the heat engine system 30 of FIG. 1; e.g., during startup of the heat engine 56.

During a generator mode of operation, the electric machine 38 of FIG. 2 operates as the electric generator to convert mechanical power into electricity. For example, the machine coupler 52 of FIG. 2 is configured as a power input for the electric machine 38. The machine coupler 52 may transfer mechanical power received from, for example, the engine rotating assembly 54 (see FIG. 1) to the machine rotor 46. This mechanical power drives rotation of the machine rotor 46. The rotation of the machine rotor 46 may generate an electromagnetic field with the machine stator 48. The machine stator 48 may convert energy from the electromagnetic field into the electricity. The electric machine 38 may output this generated electricity to the power system 40 for further use; e.g., storage, provision to other aircraft components and/or systems, etc.

The power system 40 of FIG. 2 includes an electrical power source 58 and an electrical power bus 60. The power source 58 is configured to store electricity. The power source 58 is also configured to provide the stored electricity to the electric machine 38 and/or receive electricity from the electric machine 38. The power source 58, for example, may be configured as or otherwise include one or more electricity storage devices; e.g., batteries, supercapacitors, etc. The power bus 60 electrically couples the power source 58 to the electric machine 38. The power bus 60, for example, may include one or more electrical lines 62; e.g., high voltage lines. Each electrical line 62 of FIG. 2 is electrically coupled to and extends between the power source 58 and the electric machine 38. Of course, the power system 40 may also include one or more additional electric devices 64 electrically coupled between the power source 58 and the electric machine 38 along one or more of the electrical lines 62. Examples of these electric devices 64 include, but are not limited to, switches, current regulators, converters, amplifiers, buffers and the like.

The machine fluid circuit 42 is configured to service (e.g., only) the electric machine 38. The machine fluid circuit 42 of FIG. 2, for example, is configured to lubricant and/or cool one or more components 66 of the electric machine 38. Examples of these electric machine components 66 include, but are not limited to, one or more bearings supporting the machine rotor 46 and/or its machine coupler 52, the machine stator 48 and/or the machine housing 50. The machine fluid circuit 42, in particular, is configured to deliver and/or circulate a fluid (e.g., lubricant and/or coolant) to, through, around and/or along the one or more electric machine components 66. The machine fluid circuit 42 of FIG. 2 includes one or more machine circuit lines 68A and 68B (generally referred to as "68"); e.g., fluid conduits. These machine circuit lines 68 fluidly couple the electric machine 38 and its components 66 to a fluid source 70; e.g., a lubricant and/or coolant reservoir. The source machine circuit line 68A of FIG. 2, for example, is fluidly coupled to and extends between the fluid source 70 and the electric machine 38 and one or more of its components 66. This source machine circuit line 68A is configured to direct the fluid from the fluid source 70 to the electric machine 38 and its components 66. The return machine circuit line 68B of FIG. 2 is fluidly coupled to and extends between the fluid source 70 and the electric machine 38 and one or more of its components 66. This return machine circuit line 68B is configured to return the fluid from the electric machine 38 and its components 66 to the fluid source 70. Of course, the machine fluid circuit 42 may also include one or more additional fluid devices 72 fluidly coupled between the fluid source 70 and the electric machine 38 along one or more of the machine circuit lines 68. Examples of these fluid devices 72 include, but are not limited to, pumps, valves, filters and the like.

The controller 44 is in signal communication with (e.g., hardwired and/or wirelessly coupled to) the electric machine 38. The controller 44 of FIG. 2, for example, is electrically coupled to the electric machine 38 through at least one signal line 74. This controller 44 may also or alternatively be in signal communication with one or more of the electric devices 64 (e.g., switches, current regulators, etc.) and/or one or more of the fluid devices 72 (e.g., pumps, valves, etc.). The controller 44 is configured to control operation of the electric machine 38.

Figure 3:
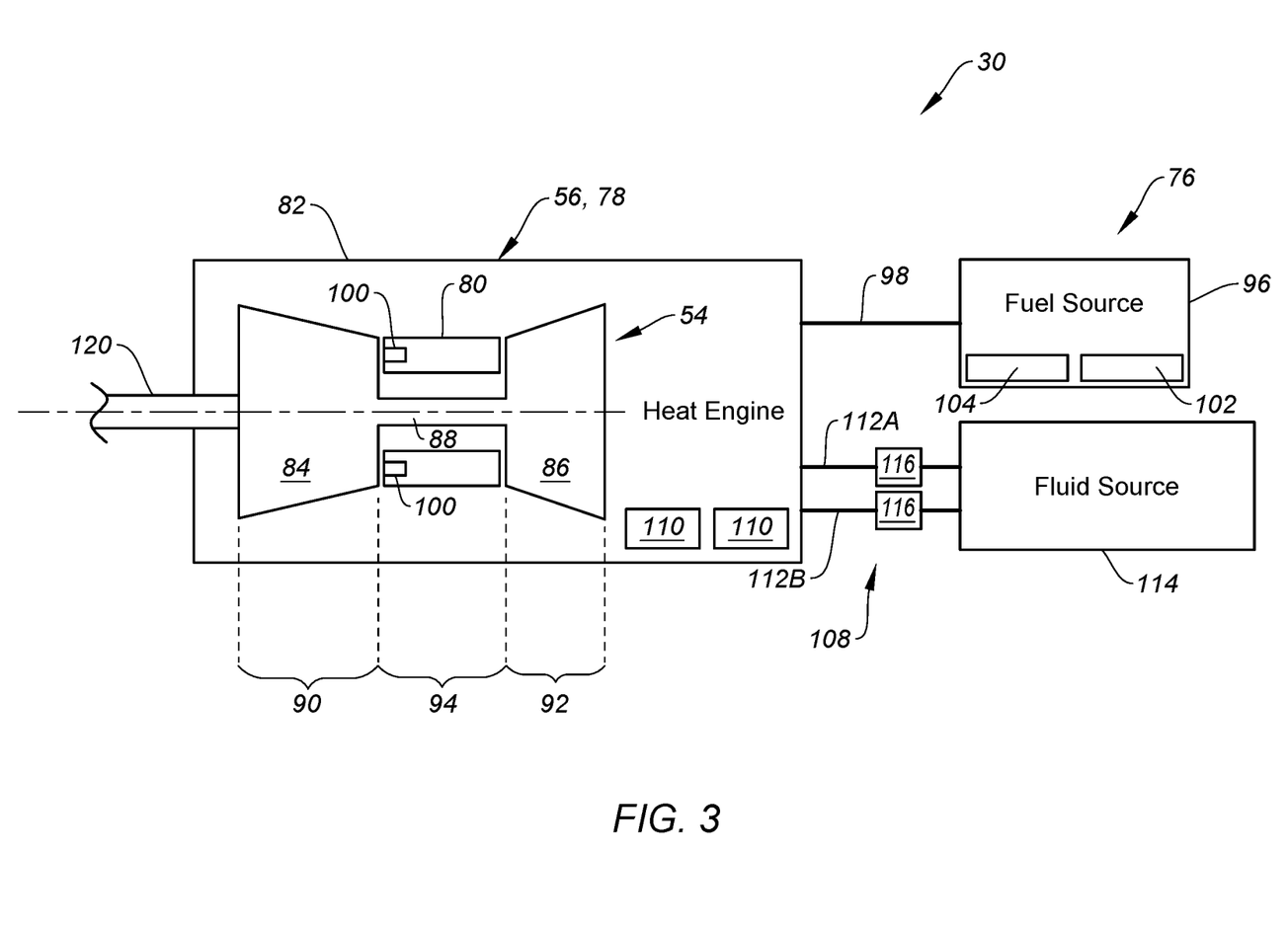
FIG. 3 is a schematic illustration of a heat engine system for the hybrid powerplant with a single spool gas turbine engine.

Referring to FIG. 3, the heat engine system 30 includes the heat engine 56 and a fuel system 76 for providing fuel to the heat engine 56. The heat engine 56 is configured to convert chemical energy stored within the fuel into mechanical power. The heat engine 56 of FIG. 3, for example, is configured as a gas turbine engine 78.

The gas turbine engine 78 of FIG. 3 includes the engine rotating assembly 54, a combustor 80 and an engine case 82 housing the engine rotating assembly 54 and the combustor 80. The engine rotating assembly 54 of FIG. 3 includes a bladed compressor rotor 84, a bladed turbine rotor 86 and an engine shaft 88 connecting the compressor rotor 84 to the turbine rotor 86. The compressor rotor 84 is arranged in a compressor section 90 of the gas turbine engine 78. The turbine rotor 86 is arranged within a turbine section 92 of the gas turbine engine 78. The combustor 80 is arranged within a combustor section 94 of the gas turbine engine 78.

The fuel system 76 of FIG. 3 includes a fuel source 96 and at least one fuel line 98. The fuel source 96 is configured to provide the fuel to one or more fuel injectors 100 of the heat engine 56 (the gas turbine engine 78 in FIG. 3) through the fuel line 98. The fuel source 96 is also configured to store (e.g., contain a quantity of) the fuel before, during and/or after heat engine operation. The fuel source 96 of FIG. 3, for example, includes a fuel reservoir 102 and a fuel flow regulator 104. The fuel flow regulator 104 may be or otherwise include a pump and/or a valve. This fuel flow regulator 104 is configured to direct fuel received from the fuel reservoir 102 to the fuel injectors 100 through the fuel line 98.

Figure 4:
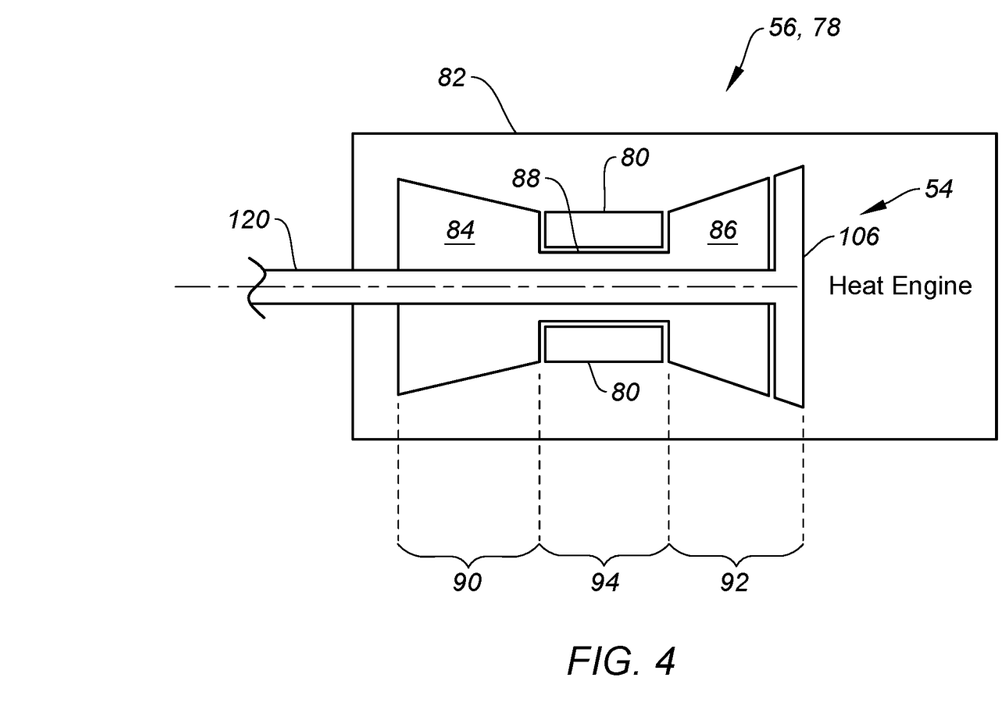
FIG. 4 is a schematic illustration of the heat engine system with a multi-spool gas turbine engine.

During operation of the gas turbine engine 78 of FIG. 3, air enters a gas path within the gas turbine engine 78 through an airflow inlet. The gas path extends sequentially through the compressor section 90, the combustor section 94 and the turbine section 92. This air is compressed by the compressor rotor 84 and directed into a combustion chamber of the combustor 80. The fuel received from the fuel system 76 is injected into the combustion chamber and mixed with the compressed air to provide a fuel-air mixture. This fuel-air mixture is ignited and combustion products thereof flow through and cause the turbine rotor 86 to rotate. The rotation of the turbine rotor 86 drives rotation of the compressor rotor 84 and, thus, compression of the air received from the airflow inlet. The rotation of the engine rotating assembly 54 also provides mechanical power for driving (e.g., rotating) the driven rotor 34 (see FIG. 1). The present disclosure, however, is not limited to such an exemplary gas turbine engine configuration. For example, referring to FIG. 4, the gas turbine engine 78 may also include a free turbine 106 (e.g., a power turbine) that provides the mechanical power for driving the driven rotor 34 (see FIG. 1). The present disclosure is also not limited to gas turbine engine applications. For example, in other embodiments, the heat engine 56 of FIG. 1 may alternatively be configured as a reciprocating piston internal combustion (IC) engine or a rotary internal combustion (IC) engine; e.g., a Wankel engine.

The heat engine system 30 of FIG. 3 also includes an engine fluid circuit 108 configured to (e.g., only) service the heat engine 56; e.g., the gas turbine engine 78. The engine fluid circuit 108 of FIG. 3, for example, is configured to lubricant and/or cool one or more components 110 of the heat engine 56. Examples of these heat engine components 110 include, but are not limited to, one or more bearings supporting the engine rotating assembly 54, seal assemblies, internal gearing, heat exchangers, etc. The engine fluid circuit 108, in particular, is configured to deliver and/or circulate a fluid (e.g., lubricant and/or coolant) to, through, around and/or along the one or more heat engine components 110. The engine fluid circuit 108 of FIG. 3 includes one or more engine circuit lines 112A and 112B (generally referred to as "112"); e.g., fluid conduits. These engine circuit lines 112 fluidly couple the heat engine 56 and its components 110 to a fluid source 114; e.g., a lubricant and/or coolant reservoir. The source engine circuit line 112A of FIG. 3, for example, is fluidly coupled to and extends between the fluid source 114 and the heat engine 56 and one or more of its components 110. This source engine circuit line 112A is configured to direct the fluid from the fluid source 114 to the heat engine 56 and its components 110. The return engine circuit line 112B of FIG. 3 is fluidly coupled to and extends between the fluid source 114 and the heat engine 56 and one or more of its components 110. This return engine circuit line 112B is configured to return the fluid from the electric machine 38 and its components to the fluid source 114. Of course, the engine fluid circuit 108 may also include one or more additional fluid devices 116 fluidly coupled between the fluid source 114 and the heat engine 56 along one or more of the engine circuit lines 112. Examples of these fluid devices 116 include, but are not limited to, pumps, valves, filters and the like.

The fluid source 114 for the engine fluid circuit 108 of FIG. 3 may be different than the fluid source 70 for the machine fluid circuit 42 of FIG. 2. Alternatively, the fluid source 114 of FIG. 3 may be the same as the fluid source 70 of FIG. 2. With either arrangement, referring to FIG. 1, the engine fluid circuit 108 may be fluidly independent of the machine fluid circuit 42, and the machine fluid circuit 42 may be fluidly independent of the engine fluid circuit 108. For example, the machine fluid circuit 42 may be fluidly discrete from the engine fluid circuit 108. Even where the machine fluid circuit 42 and the engine fluid circuit 108 are fluidly coupled to the same fluid source in parallel, each fluid circuit 42, 108 may be completely independently coupled to the fluid source. The fluid circuits 42 and 108 of FIG. 1, for example, are not fluidly interconnected with one another (at least within the powerplant housing 22). This may facilitate arranging the electric machine 38 discrete from the heat engine 56 as described below in further detail.

The geartrain 32 is configured to operatively couple the electric machine 38 and the heat engine 56 to the mechanical load 26. The machine coupler 52, for example, rotatably couples the electric machine 38 and its machine rotor 46 to a first component 118 of the geartrain 32; e.g., a gear, a carrier, a shaft, etc. A heat engine coupler 120 (e.g., a shaft) rotatably couples the heat engine 56 and its engine rotating assembly 54 to a second component 122 of the geartrain 32; e.g., a gear, a carrier, a shaft, etc. A driven rotor coupler 124 (e.g., a shaft) rotatably couples the mechanical load 26 and its driven rotor 34 to a third component 126 of the geartrain 32; e.g., a gear, a carrier, a shaft, etc. These geartrain components 118, 122 and 126 are arranged together within a geartrain case 128 such that mechanical power may be transmitted through the geartrain 32 and its components 118, 122 and 126, for example: (1) from the electric machine 38 to the driven rotor 34; (2) from the heat engine 56 to the driven rotor 34; (3) from the heat engine 56 to the electric machine 38; and/or (4) from the electric machine 38 to the heat engine 56.

In some embodiments, a geartrain fluid circuit 130 may be provided to service (e.g., only) the geartrain 32. The geartrain fluid circuit 130 of FIG. 1, for example, is configured to lubricant and/or cool one or more components 132 of the geartrain 32; e.g., gears, bearings, shafts, etc. The engine fluid circuit 108, in particular, is configured to deliver and/or circulate a fluid (e.g., lubricant and/or coolant) to, through, around and/or along the one or more geartrain components 132. The geartrain fluid circuit 130 of FIG. 1 includes one or more geartrain circuit lines 134A and 134B (generally referred to as "134"); e.g., fluid conduits. These geartrain circuit lines 134 fluidly couple the geartrain 32 and its components 132 to a fluid source; e.g., a lubricant and/or coolant reservoir. The source geartrain circuit line 134A of FIG. 1, for example, is fluidly coupled to and extends between the fluid source and the geartrain 32. This source geartrain circuit line 134A is configured to direct the fluid from the fluid source to the geartrain 32. The return geartrain circuit line 134B of FIG. 1 is fluidly coupled to and extends between the fluid source and the geartrain 32. This return geartrain circuit line 134B is configured to return the fluid from the geartrain 32 to the fluid source. Of course, the geartrain fluid circuit 130 may also include one or more additional fluid devices 136 fluidly coupled between the fluid source and the geartrain 32 along one or more of the geartrain circuit lines 134. Examples of these fluid devices 136 include, but are not limited to, pumps, valves, filters and the like.

The fluid source for the geartrain fluid circuit 130 of FIG. 1 may be different than the fluid source 70 for the machine fluid circuit 42 of FIG. 2. Alternatively, fluid source for the geartrain fluid circuit 130 of FIG. 1 may be the same as the fluid source 70 for the machine fluid circuit 42 of FIG. 2. With either arrangement, referring to FIG. 1, the geartrain fluid circuit 130 may be fluidly independent of the machine fluid circuit 42, and the machine fluid circuit 42 may be fluidly independent of the geartrain fluid circuit 130. For example, the machine fluid circuit 42 may be fluidly discrete from the geartrain fluid circuit 130. Even where the machine fluid circuit 42 and the geartrain fluid circuit 130 are fluidly coupled to the same fluid source in parallel, each fluid circuit 42, 130 may be completely independently coupled to the fluid source. The fluid circuits 42 and 130 of FIG. 1, for example, are not fluidly interconnected with one another (at least within the powerplant housing 22). This may facilitate arranging the electric machine 38 discrete from the geartrain 32 as described below in further detail. Similarly, the geartrain fluid circuit 130 may be fluidly independent from the heat engine fluid circuit 108. However, it is also contemplated the geartrain fluid circuit 130 may alternatively be incorporated with the engine fluid circuit 108 into a common fluid circuit.

The powerplant housing 22 of FIG. 1 includes one or more containment zones 138A and 138B (generally referred to as "138"); e.g., fire zones. Each of these containment zones 138 is configured as a discrete section within the powerplant housing 22 for housing (e.g., containing) one or more components (e.g., 32, 38 and 56) of the hybrid powerplant 20. The electric machine 38 of FIG. 1, for example, is housed within the electric machine containment zone 138A ("machine zone"). The heat engine 56 is housed within the heat engine containment zone 138B ("engine zone"). The geartrain 32 may also be housed within the engine zone 138B. Here, the engine zone 138B also forms an engine compartment 140 for the heat engine 56 and/or the geartrain 32 within the powerplant housing 22. By arranging the electric machine 38 in a different containment zone from at least the heat engine 56, high voltage electricity running through the portion of the electric machine system 28 within the powerplant housing 22 may be (e.g., completely) separated from combustible/flammable fluids (e.g., the fuel, lubricant, hydraulic fluid, etc.) flowing through and/or about the portion of the heat engine system 30 within the powerplant housing 22. Thus, at least the combustible/flammable fluids (e.g., the fuel, the lubricant, the coolant, etc.) associated with the heat engine 56 and the engine system 30 and/or the combustible/flammable fluids (e.g., the lubricant, the coolant, etc.) associated with the geartrain 32 may be (e.g., completely) separated from a high voltage ignition source within the powerplant housing 22. Moreover, the combustible/flammable fluids (e.g., the lubricant, the coolant, etc.) associated with the heat engine 56 may be (e.g., completely) separated from a high temperature ignition source within the powerplant housing 22.

The powerplant housing 22 of FIG. 1 includes an electric machine containment wall 142; e.g., a firewall. This machine containment wall 142 forms an outer peripheral boundary of the machine zone 138A. At least one section 144A of the machine containment wall 142 may form a fluid and/or fire barrier between the electric machine 38 and its associated machine zone 138A and the heat engine 56 and its associated engine zone 138B. At least one section 144B of the machine containment wall 142 may form a fluid and/or fire barrier between the electric machine 38 and its associated machine zone 138A and the geartrain 32 and its associated engine zone 138B. While the machine coupler 52 of FIG. 1 extends through the containment wall section 142B, a seal between the machine coupler 52 and the containment wall section 142B may maintain the barrier/separation between the machine zone 138A and the engine zone 138B. At least one section 142C of the machine containment wall 142 may form a fluid and/or fire barrier between the electric machine 38 and its associated machine zone 138A and an open air environment 146 outside of the hybrid powerplant 20 (or, alternatively another zone within the powerplant housing 22). At least one section 144D of the machine containment wall 142 may form a fluid and/or fire barrier between the electric machine 38 and its associated machine zone 138A and a structure 148 for mounting the hybrid powerplant 20 with, for example, a fuselage 150 of the aircraft; e.g., a pylon. While the electrical lines 62, the machine circuit lines 68 and/or the signal line 74 of FIG. 1 extend through the containment wall section 144D, seals and/or interfaces between those components and the containment wall section 144D may maintain the barrier/separation between the machine zone 138A and an internal volume 152 of the mounting structure 148. With this arrangement, the machine containment wall 142 may form a (e.g., substantially sealed) internal volume (e.g., cavity, chamber, etc.) that is fluidly discrete (e.g., decoupled) from one or more or all surrounding volumes including an internal volume within the engine zone 138B/the engine compartment 140.

In addition to the foregoing, each of the lines 62, 68, 74 may extend from an area outside of the powerplant housing 22 (e.g., directly) into the machine zone 138A without extending into and/or through the engine zone 138B/the engine compartment 140. In other words, while the lines 62, 68, 74 may cross the machine containment wall 142, one or more or all of these lines 62, 68, 74 may be routed to bypass (e.g., extend around, etc.) the engine zone 138B/the engine compartment 140. Thus, none of the lines 62, 68, 74 provides a (e.g., direct) pathway between the machine zone 138A and the engine zone 138B/the engine compartment 140 during an unlikely case of an emergency condition. Similarly, each of the lines 98, 112, 134 may extend from an area outside of the powerplant housing 22 (e.g., directly) into the engine zone 138B/the engine compartment 140 without extending into and/or through the machine zone 138A. In other words, while the lines 98, 112, 134 may cross into the engine zone 138B/the engine compartment 140, one or more or all of these lines 98, 112, 134 may be routed to bypass the machine zone 138A. Thus, none of the lines 98, 112, 134 provides a (e.g., direct) pathway between the machine zone 138A and the engine zone 138B/the engine compartment 140 during an unlikely case of an emergency condition.

The machine containment wall 142 and one or more or all of its sections 144A-D (generally referred to as "144") are configured to maintain an integrity of the machine zone 138A even when subject to, for example, a (e.g., momentary and/or periodic) high voltage electrical arc and/or a fire within (or outside of) the machine zone 138A. The machine containment wall 142 and its sections 144, for example, may be configured to structurally withstand (e.g., not be pierced or otherwise compromised by) an electrical arc of, for example, at least two-hundred and twenty volts (220V), five hundred volts (500V), one-thousand volts (1000V), fifteen-hundred volts 1500V), two-thousand volts (2000V) or more. More particularly, the machine containment wall 142 and its sections 144 may be configured to structurally withstand an electrical arc with a voltage equal to or slightly higher than (e.g., by a safety factor) a voltage of the electricity running through the electric machine system 28 during operation of the hybrid powerplant 20. The machine containment wall 142 and its sections 144 may also or alternatively be configured to structurally withstand (e.g., not be compromised by) a fire within or outside of the machine zone 138A for a prescribed period of time; e.g., at least or about five minutes, ten minutes, fifteen minutes, twenty minutes, etc. To meet these containment parameters, the machine containment wall 142 and one or more or all of its sections 144 may be constructed from a high voltage electrical arc resistant material and/or fire resistant material such as metal and/or composite material. Dimensions (e.g., a thickness, etc.) of the machine containment wall 142 and one or more or all of its sections 144 may also be selected (e.g., increased) to meet the foregoing containment parameters.

Figure 5:
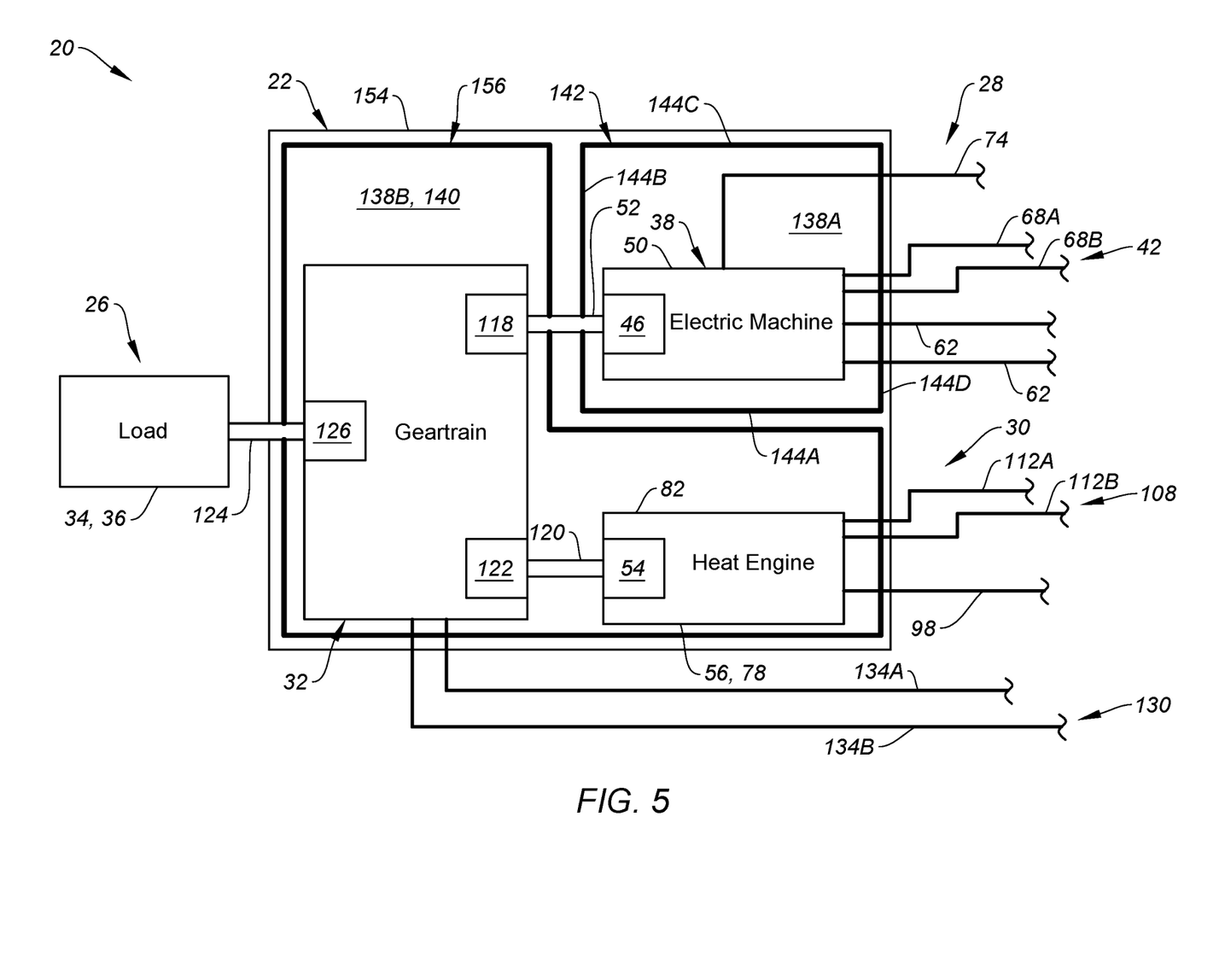
FIGS. 5-7 are schematic illustrations of the hybrid powerplant with various multi-containment wall arrangements.

The powerplant housing 22 of FIG. 1 also includes a housing structure 154 which may be configured as or otherwise include a nacelle structure and/or a case structure. The machine zone 138A and its machine containment wall 142 are arranged within the housing structure 154. The engine zone 138B is also arranged within the housing structure 154, where one or more sections of the housing structure 154 and/or one or more sections (e.g., 144A and 144B) of the machine containment wall 142 may form a peripheral outer boundary of the engine zone 138B. In other embodiments, referring to FIG. 5, the powerplant housing 22 may include another containment wall 156 within the housing structure 154 that forms a boundary of the engine zone 138B at least between the heat engine 56 and the electric machine 38, or completely around at least the components 32 and 56. This engine containment wall 156 may be configured to maintain an integrity of the engine zone 138B even when subject to, for example, a fire within (or outside of) the engine zone 138B. The engine containment wall 156, for example, may be configured to structurally withstand (e.g., not be compromised by) a fire within or outside of the engine zone 138B for a prescribed period of time; e.g., at least or about five minutes, ten minutes, fifteen minutes, twenty minutes, etc.

Figure 6:
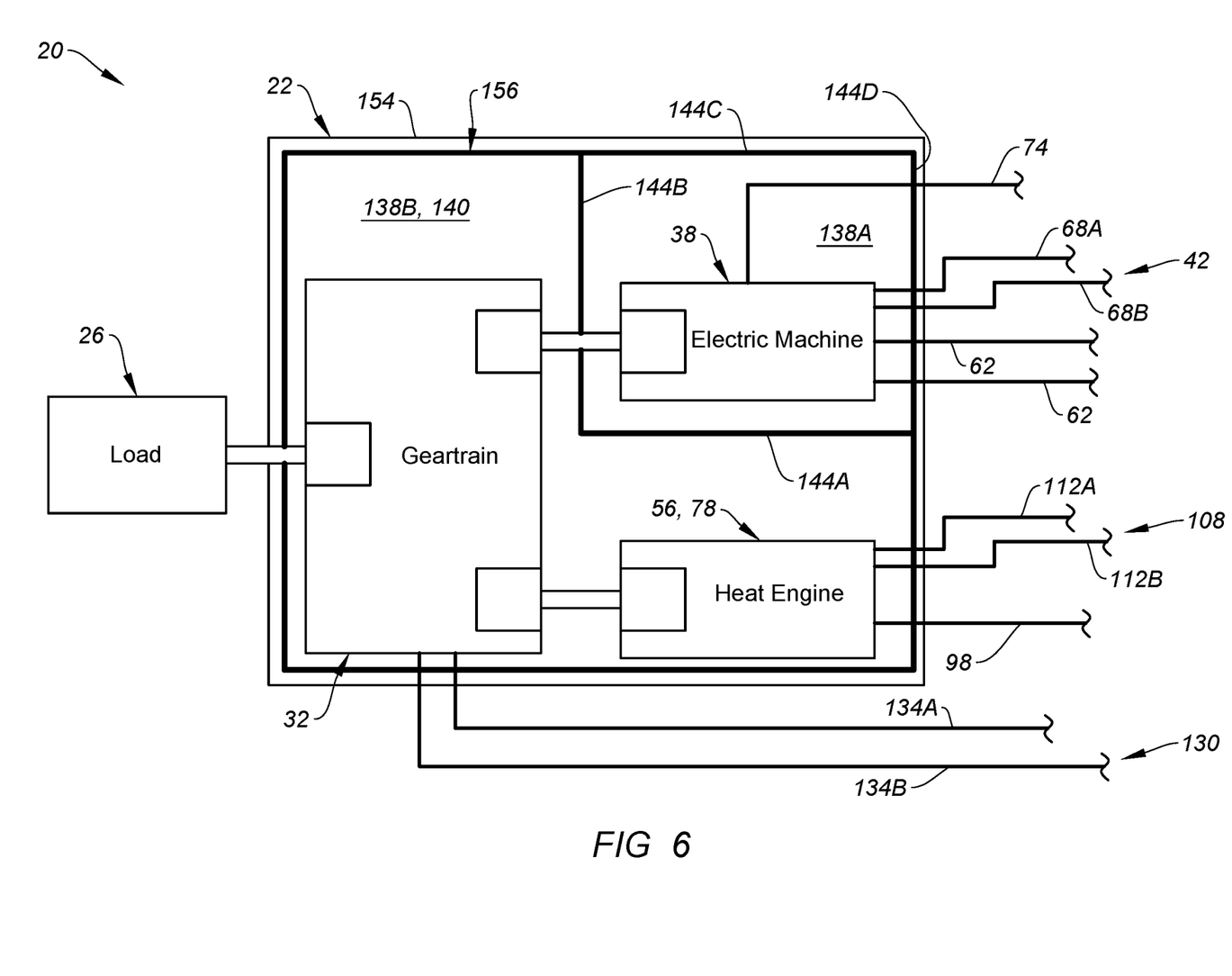

In some embodiments, referring to FIG. 6, a portion of the containment wall 142 between the machine zone 138A and the engine zone 138B may be omitted. For example, the machine zone 138A and the engine zone 138B and, more particularly, the containment walls 142 and 156 may share one or more common wall sections (e.g., 144A and 144B).

Figure 7:
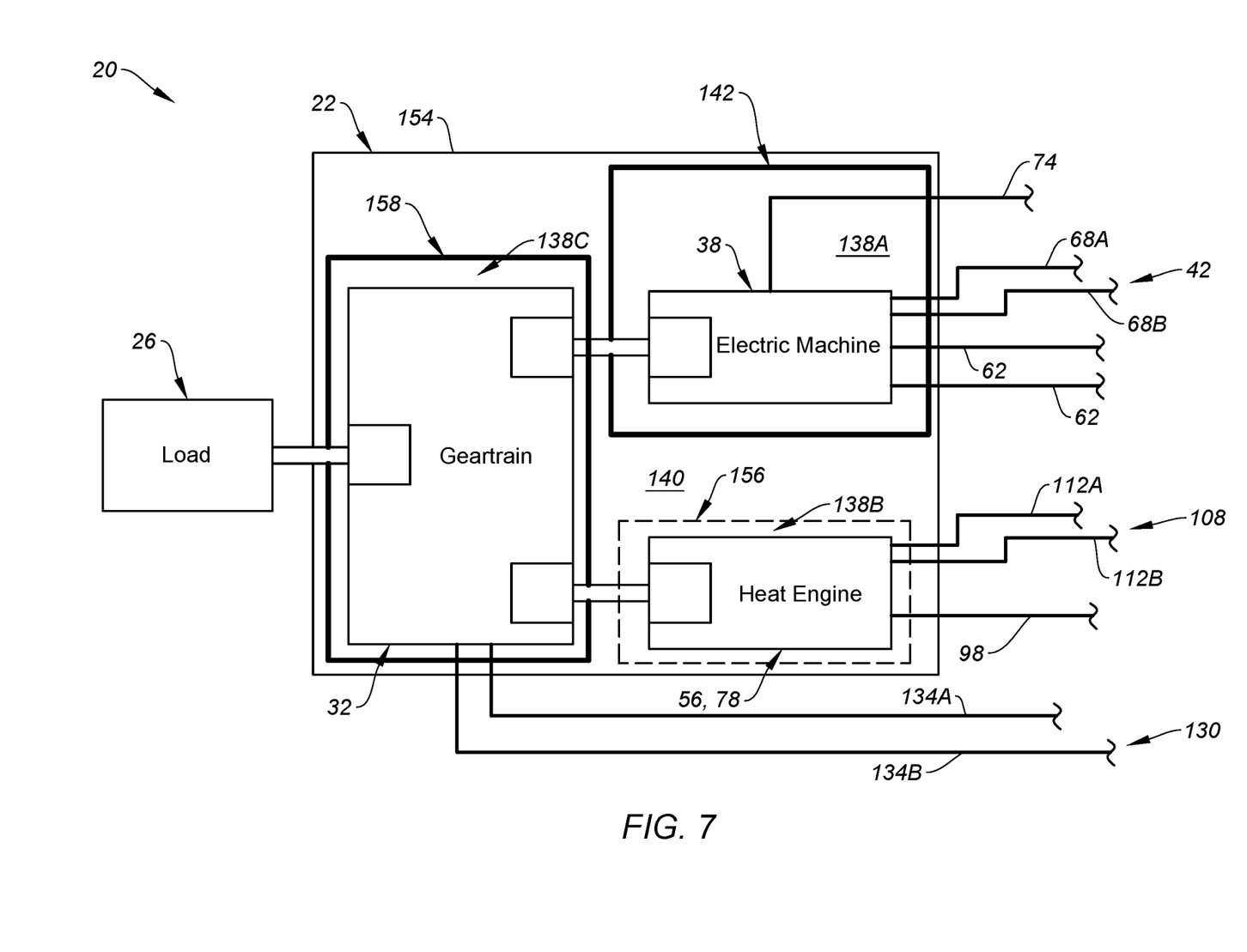

In some embodiments, referring to FIG. 7, the powerplant housing 22 may include another containment wall 158 (in addition to or as an alternative to the engine containment wall 156) within the housing structure 154 that forms a boundary of or a geartrain containment zone 138C ("geartrain zone") around the geartrain 32. This geartrain containment wall 158 may be configured to maintain an integrity of the geartrain zone 138C even when subject to, for example, a fire within (or outside of) the geartrain zone 138C. The geartrain containment wall 158, for example, may be configured to structurally withstand (e.g., not be compromised by) a fire within or outside of the geartrain zone 138C for a prescribed period of time; e.g., at least or about five minutes, ten minutes, fifteen minutes, twenty minutes, etc. With this arrangement, the geartrain 32 and its geartrain fluid circuit 130 may be isolated from the heat engine 56 and the electric machine 38 within the powerplant housing 22.

Figure 8:
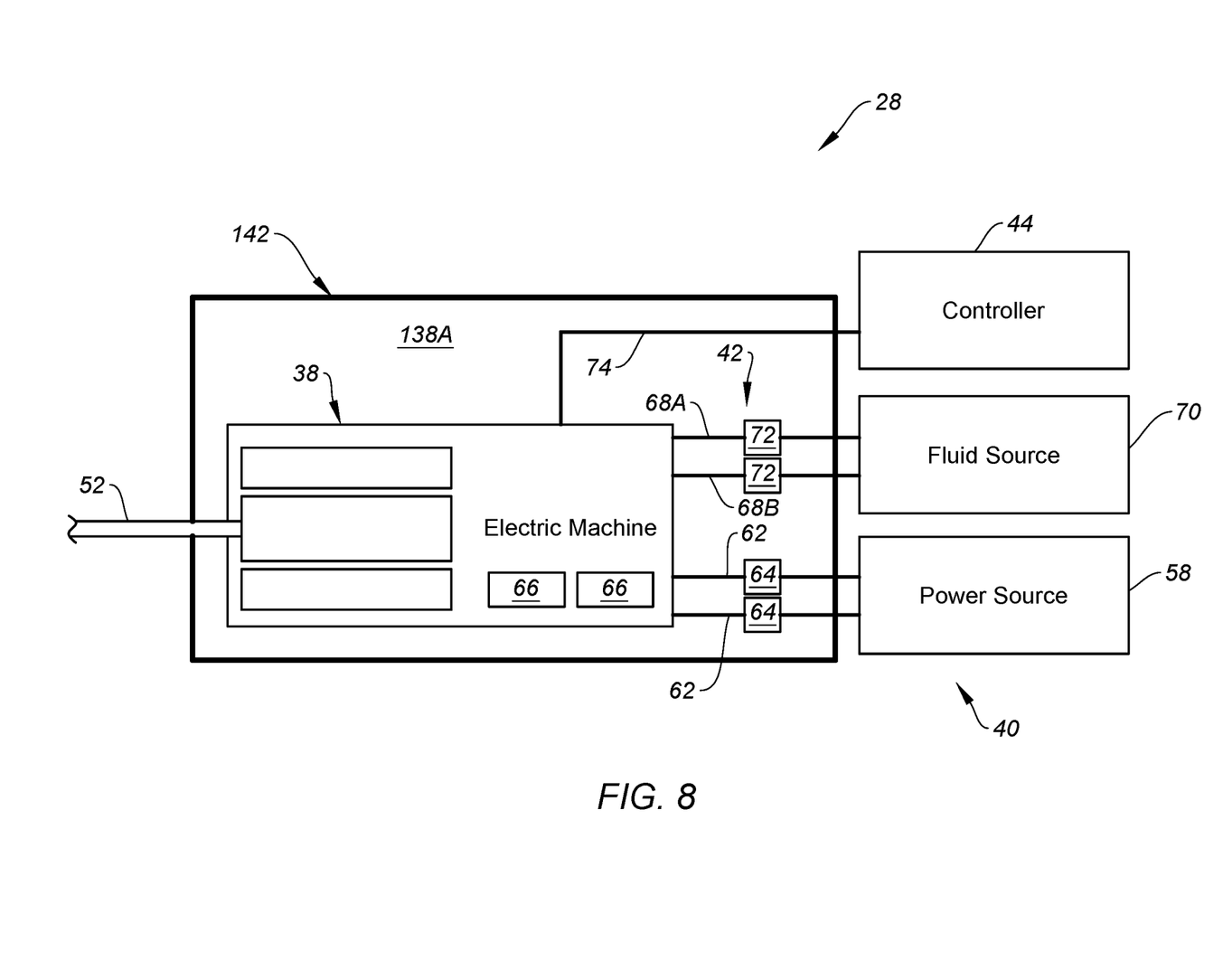
FIGS. 8 and 9 are schematic illustrations of the electric machine system with various containment wall arrangements.
Figure 9:
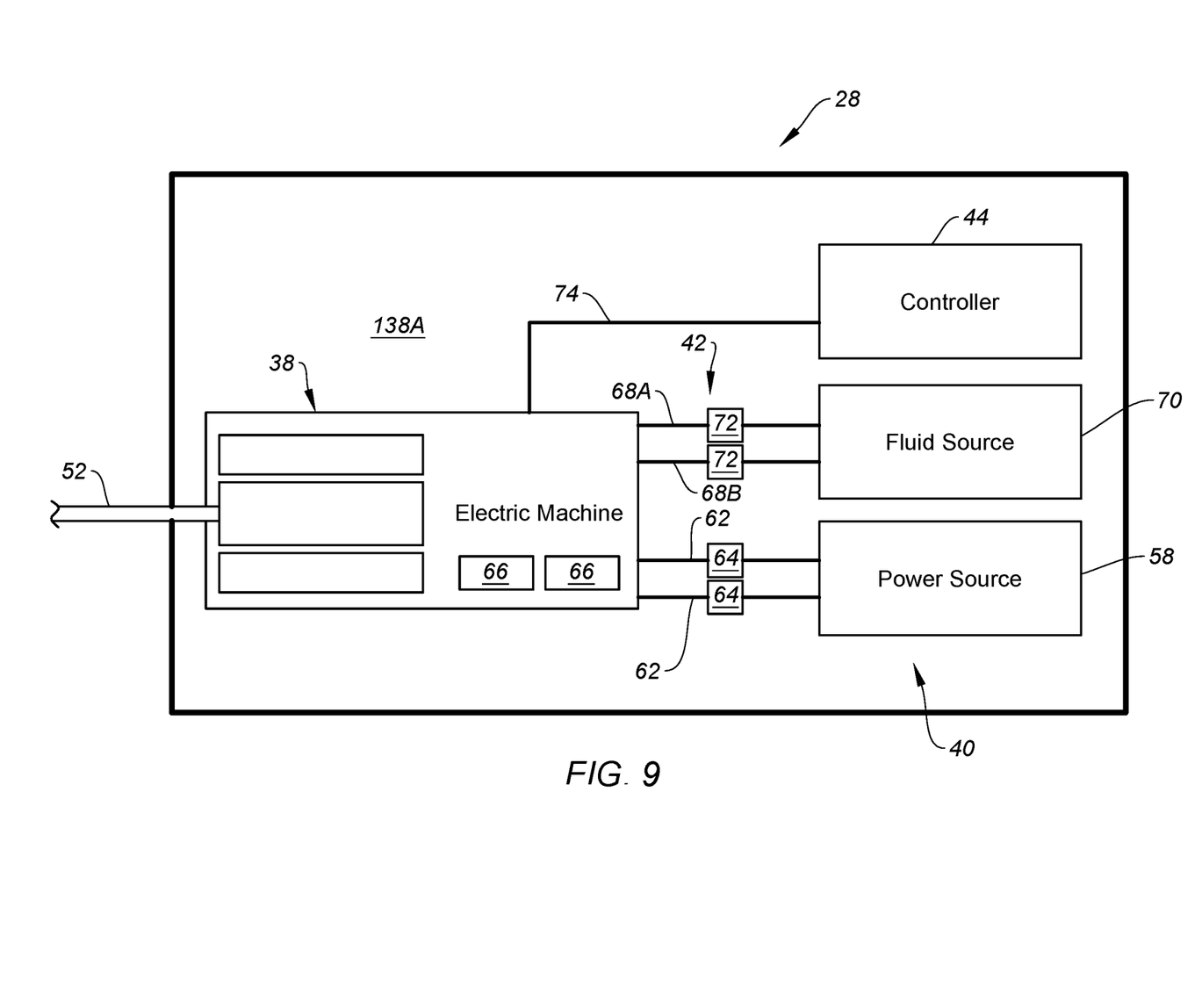

In some embodiments, referring to FIG. 8, one or more of the devices 64, 72 may be arranged within the machine zone 138A. In other embodiments, referring to FIG. 9, the entire engine power system 40, the entire machine fluid circuit 42 (e.g., and optionally the fluid source 70) and/or the controller 44 may be arranged within the machine zone 138A. Such an arrangement may further isolate the electric machine system 28 from other hybrid powerplant components during an unlikely case of an emergency condition. As similar arrangement may also or alternatively be made for the heat engine system 30 and/or the geartrain fluid circuit 130.

In some embodiments, referring to FIGS. 1 and 5-7, one or more of the containment zones 138 may each be configured as a substantially sealed volume and/or a pressurized volume. For example, an atmosphere within the machine zone 138A may be pressurized to further reduce a possibility of combustible/flammable fluid leakage from another area (e.g., the engine zone 138B and/or the geartrain zone 138C) into the machine zone 138A.

Figure 10:
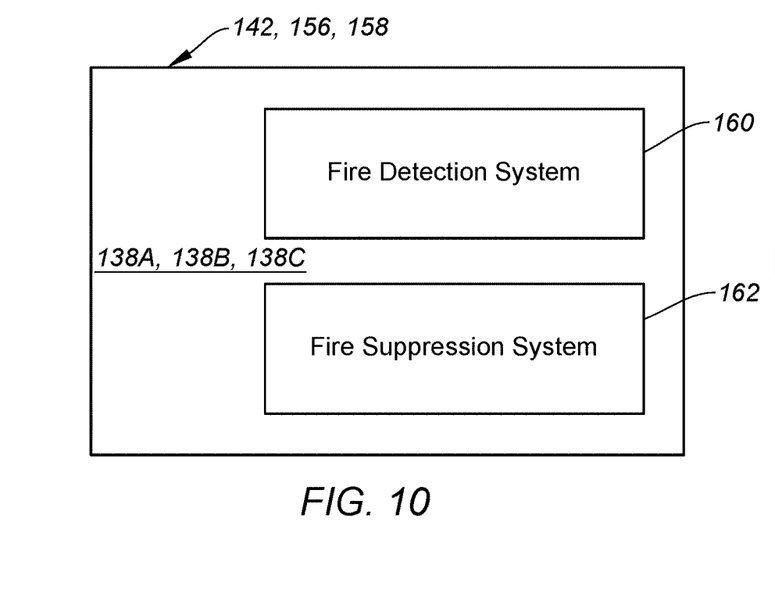
FIG. 10 is a schematic illustration of a fire detection system and a fire suppression system for a containment zone.

In some embodiments, referring to FIG. 10, one or more or all of the containment zones 138 may each be configured with a fire detection system 160 and/or a fire suppression system 162. The fire detection system 160 is configured to detect a fire within the respective containment zone 138. The fire suppression system 162 is configured to suppress or extinguish the fire within the respective containment zone 138, for example, upon detection of the fire by the fire detection system 160.

Figure 11:
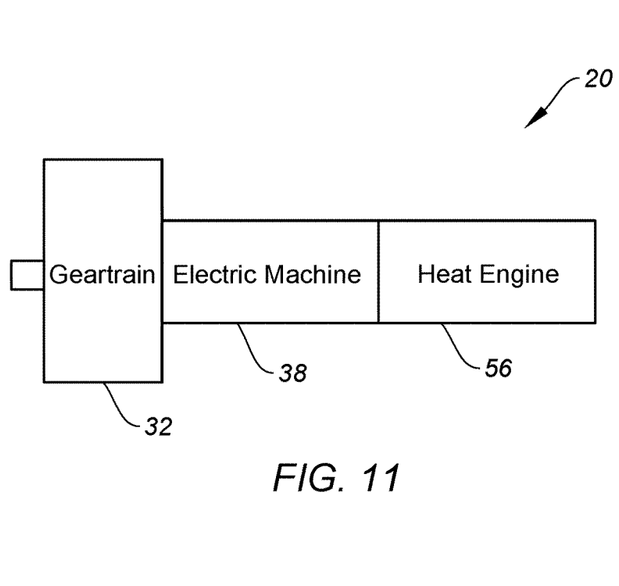
FIGS. 11-13 are schematic illustrations of the hybrid powerplant with various heat engine-electric machine arrangements.
Figure 12:
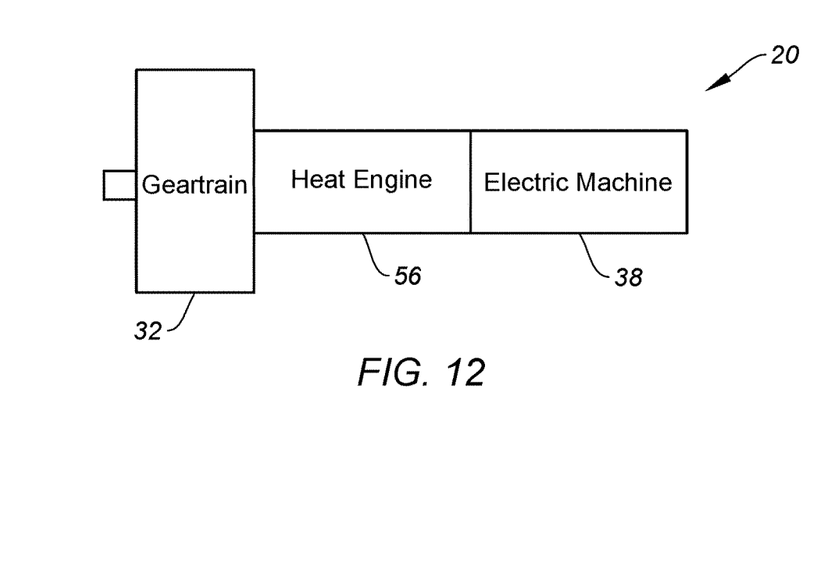
Figure 13:
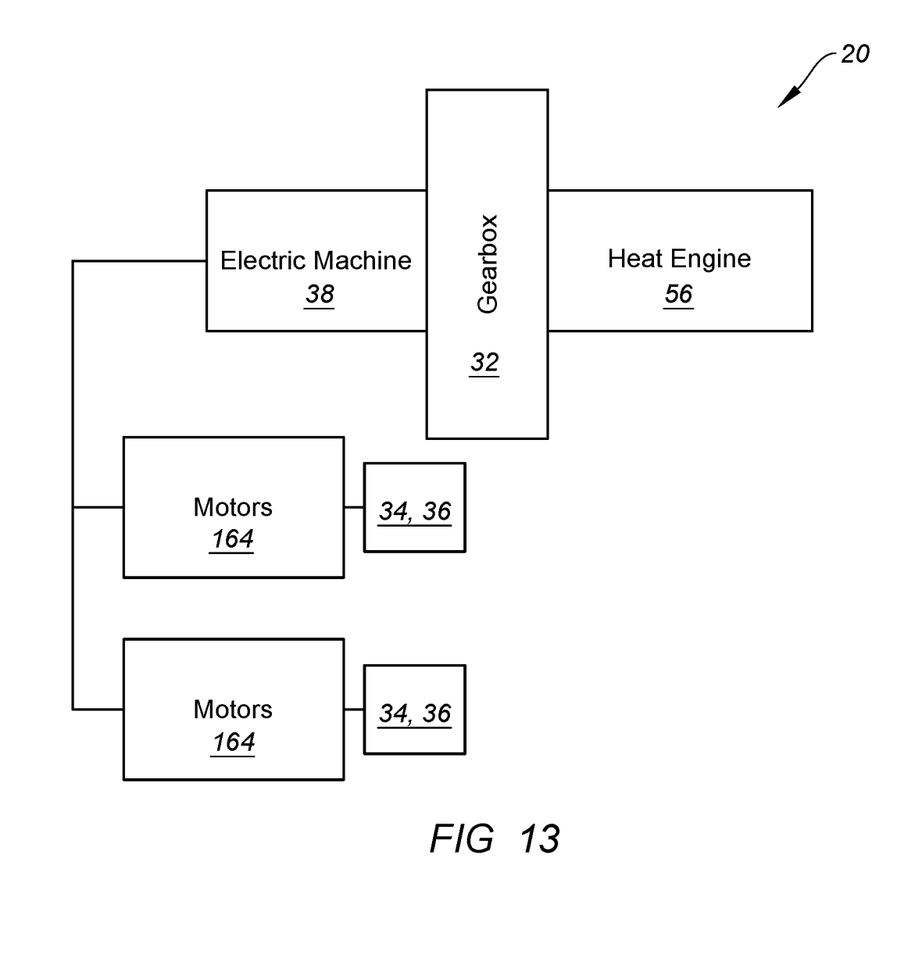

In some embodiments, referring to FIG. 1, the geartrain 32 may be coupled with the electric machine 38 and the heat engine 56 in parallel. In other embodiments, referring to FIG. 11-13, the electric machine 38, the heat engine 56 and the geartrain 32 (when included) may be arranged in series. The electric machine 38 of FIG. 11, for example, is coupled to and between the heat engine 56 and the geartrain 32, where the geartrain 32 may operatively couple the elements 38 and/or 56 to the mechanical load. The heat engine 56 of FIG. 12 is coupled to and between the electric machine 38 and the geartrain 32, where the geartrain 32 may operatively couple the elements 38 and/or 56 to the mechanical load. The geartrain 32 of FIG. 13 is coupled to and between the electric machine 38 and the heat engine 56. In the embodiment of FIG. 13, the electric machine 38 may operate as a generator which provides power to one or more additional motors 164, where each motor 164 may drive rotation of a respective driven rotor 34; e.g., a propulsor rotor 36.

In some embodiments, the containment wall 142, 156, 158 may be configured as a discrete component and/or structure from the components (e.g., the electric machine 38, etc.) disposed within the containment zone 142, 156, 158. However, in other embodiments, it is contemplated the containment wall 142, 156, 158 may include at least (or only) one component and/or structure of one or more or all of the components (e.g., the machine housing 50, etc.) disposed within the containment zone 142, 156, 158.

While the powerplant housing 22 may be discrete from the fuselage 150 as generally described above, the powerplant housing 22 may alternative be configured within and/or part of the fuselage 150.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A hybrid powerplant for an aircraft, comprising:
a housing including a machine containment zone and an engine compartment outside of the machine containment zone;
an electric machine arranged within the machine containment zone;
a machine fluid circuit servicing the electric machine, the machine fluid circuit extending in the machine containment zone and arranged outside of the engine compartment;
a heat engine arranged within the engine compartment; and
a geartrain operatively connected to the electric machine and the heat engine;
the housing further including a firewall at least partially forming the machine containment zone, and the firewall configured to maintain the machine containment zone when subjected to an electrical arc of at least two-hundred and twenty volts.

2. The hybrid powerplant of claim 1, wherein the firewall forms a fluid barrier between the machine containment zone and the engine compartment.

3. The hybrid powerplant of claim 1, wherein the firewall is configured to maintain the machine containment zone when subjected to a fire.

4. The hybrid powerplant of claim 1, wherein a mechanical coupler projects through the firewall and operatively couples the electric machine to the geartrain.

5. The hybrid powerplant of claim 1, further comprising:
a fluid source arranged outside of the housing;
the machine fluid circuit fluidly coupling the fluid source with the electric machine; and
the machine fluid circuit extending into the machine containment zone from an area outside of the housing.

6. The hybrid powerplant of claim 5, wherein the machine fluid circuit extends across the firewall.

7. The hybrid powerplant of claim 1, further comprising:
a fluid source arranged within the machine containment zone;
the machine fluid circuit fluidly coupling the fluid source with the electric machine.

8. The hybrid powerplant of claim 1, wherein the machine fluid circuit is configured to cool one or more components of the electric machine.

9. The hybrid powerplant of claim 1, further comprising:
an engine fluid circuit servicing the heat engine;

the engine fluid circuit extending in the engine compartment and arranged outside of the machine containment zone; and the engine fluid circuit and the machine fluid circuit fluidly independent of one another.

10. The hybrid powerplant of claim 1, further comprising:
a geartrain fluid circuit servicing the geartrain;
the geartrain fluid circuit extending in the housing and arranged outside of the machine containment zone; and
the geartrain fluid circuit and the machine fluid circuit fluidly independent of one another.

11. The hybrid powerplant of claim 1, wherein
the housing further comprises an engine containment zone fluidly decoupled from the machine containment zone; and
the heat engine is arranged within the engine containment zone.

12. The hybrid powerplant of claim 11, wherein the geartrain is further arranged in the engine containment zone.

13. The hybrid powerplant of claim 11, wherein the geartrain is arranged outside of the machine containment zone and the engine containment zone.

14. The hybrid powerplant of claim 1, further comprising:
a bladed rotor;
at least one of the electric machine or the heat engine operatively coupled to and configured to drive rotation of the bladed rotor.

15. A hybrid powerplant for an aircraft, comprising:
a housing including a machine containment zone and an engine compartment outside of the machine containment zone;
an electric machine arranged within the machine containment zone;
a machine fluid circuit servicing the electric machine, the machine fluid circuit extending in the machine containment zone and arranged outside of the engine compartment;
a first fluid source fluidly coupled to the machine fluid circuit, wherein the machine fluid circuit is configured to provide first lubricant received from the first fluid source to one or more components of the electric machine;
a heat engine arranged within the engine compartment;
an engine fluid circuit servicing the heat engine;
a second fluid source fluidly coupled to the engine fluid circuit, wherein the engine fluid circuit is configured to provide second lubricant received from the second fluid source to one or more components of the heat engine, and the second fluid source is different than the first fluid source; and
a geartrain operatively connected to the electric machine and the heat engine.

16. A hybrid powerplant for an aircraft, comprising:
a housing including a machine containment zone and an engine compartment outside of the machine containment zone;
an electric machine arranged within the machine containment zone;
a machine fluid circuit servicing the electric machine, wherein the machine fluid circuit does not extend outside of the machine containment zone within the housing;
a heat engine arranged within the engine compartment; and
a geartrain operatively connected to the electric machine and the heat engine.

* * * * *